United States Patent
Voigt et al.

(10) Patent No.: US 7,469,075 B2
(45) Date of Patent: Dec. 23, 2008

(54) DIGITAL PHASE MODULATOR FOR A FIBER-OPTIC DEVICE

(75) Inventors: Sven Voigt, Freiburg (DE); Guenter Spahlinger, Stuttgart (DE); Alfons Newzella, Gundelfingen (DE)

(73) Assignee: LITEF GmbH, Freiburg (DE)

( * ) Notice: Subject to any disclaimer, the term of this patent is extended or adjusted under 35 U.S.C. 154(b) by 402 days.

(21) Appl. No.: 10/546,414

(22) PCT Filed: Feb. 19, 2004

(86) PCT No.: PCT/EP2004/001641

§ 371 (c)(1),
(2), (4) Date: Aug. 19, 2005

(87) PCT Pub. No.: WO2004/074775

PCT Pub. Date: Sep. 2, 2004

(65) Prior Publication Data

US 2006/0147146 A1    Jul. 6, 2006

(30) Foreign Application Priority Data

Feb. 21, 2003    (DE)    ................................ 103 07 525

(51) Int. Cl.
*G02F 1/035* (2006.01)
(52) U.S. Cl. ............................................. 385/3; 385/40
(58) Field of Classification Search .................. 385/1–3, 385/8, 40
See application file for complete search history.

(56) References Cited

U.S. PATENT DOCUMENTS

| 4,288,785 | A  | * | 9/1981  | Papuchon et al. ........... 341/111 |
|-----------|----|---|---------|------------------------------------|
| 5,137,359 | A  |   | 8/1992  | Steele                             |
| 5,237,629 | A  | * | 8/1993  | Hietala et al. .................. 385/3 |
| 6,760,111 | B1 | * | 7/2004  | Mark et al. .................. 356/464 |
| 7,102,757 | B2 | * | 9/2006  | Spahlinger et al. .......... 356/483 |
| 7,283,246 | B2 | * | 10/2007 | Voigt et al. .................. 356/464 |
| 2006/0209306 | A1 | * | 9/2006 | Spahlinger et al. .......... 356/464 |

FOREIGN PATENT DOCUMENTS

| DE | 19629260 | 2/1998 |
|----|----------|--------|
| DE | 19753427 | 2/1999 |
| GB | 2185123  | 7/1987 |

* cited by examiner

*Primary Examiner*—Sarah Song
(74) *Attorney, Agent, or Firm*—Elliott N. Kramsky

(57) ABSTRACT

A method and arrangement of electrodes for increasing the resolution of a digital phase modulator for a fiber-optic signal transmission or measuring device. A predetermined total number m of electrodes of different lengths are arranged parallel and on both sides with respect to a light guiding path in or on an optical substrate. The electrodes are divided into two groups. A first group n of electrodes represents a coarse modulator with binary and more significant weighted electrodes of length ratio $b_{n+0}:b_n=2$, the longest electrode of which corresponds to the sum of lengths of all the remaining electrodes of the overall modulator. A second, smaller group of $n_0$ non-binary and less significant weighted electrodes represents a fine modulator. The smallest output values are not formed by driving individual electrodes of the fine modulator, but rather by forming the difference, in each case, between two larger electrodes.

18 Claims, 5 Drawing Sheets

DIGITAL PHASE MODULATOR FOR A FIBER-OPTIC DEVICE

BACKGROUND

1. Field of the Invention

The present invention relates to digital phase modulators. More particularly, this invention pertains to a method for increasing the resolution of a digital phase modulator for a fiber-optic signal transmission or measuring device.

2. Description of the Prior Art

It is known to apply the same potentials to the electrodes of a phase modulator for driving purposes. The potentials, depending on their positions with respect to the light guiding path, effect a positive or negative shift in the light phase as the output of the modulator. (Electrodes are also referred to below as "positive" or "negative").

Patent specification DE 197 53 427 C1 (Germany) discloses a method and a device for increasing the accuracy of a digital phase modulator constructed from binary weighted surface electrodes. Such a modulator may be employed in a fiber-optic signal transmission or measuring device (preferably a fiber-optic interferometer). In such a device, a less significant portion of a binary drive signal is fed via a digital/analog converter, with driver connected downstream, to a specific analog electrode of a digital phase modulator. Provision is made for storing correction values in a storage table that can be individually assigned to the electrodes of the phase modulator. In this way, manufacturing-related inaccuracies in phase modulation values can be corrected. Although the solution described in the cited patent document enables resolution to be increased, its technical complexity is comparatively high due, in part, to the use of correction tables, and in part to the need to employ a digital-to-analog converter with driver whose analog output values are of only limited thermal stability. Particularly when employed in fiber-optic gyroscopes (FOGs) having a closed control loop and other fiber-optic signal transmission and measuring devices, higher resolution without substantially larger substrate sizes is desired than has been previously achieved.

SUMMARY OF THE INVENTION

It is therefore an object of the present invention to provide a method and a device for increasing the resolution of a digital phase modulator for a fiber-optic signal transmission or measuring device.

It is a further object of the invention to achieve the preceding object by means of a method and a device that accomplish significantly increased resolution without any digital/analog conversion.

The present invention addresses the preceding and other objects by providing, in a first aspect, a method for increasing the resolution of a digital phase modulator for a fiber-optic signal transmission or measuring device. Such device is of the type that is equipped with a predetermined total number m of positive and negative electrodes of differing lengths arranged in parallel and on both sides with respect to a light guiding path in or on an optical substrate. Preferably identical control potentials can be applied to the electrodes. Depending on the position of the electrode with respect to the light guiding path, a positive or a negative phase shift in the light is effected as the output of the modulator. It is possible to set a multiplicity of phase values by varying the choice of driving and combinations of positively and negatively acting electrodes within a predetermined value range.

In the method of the invention, the total number m of electrodes of the phase modulator is divided into two groups. A first group n of electrodes forming a coarse modulator with binary and more significant weighted electrodes with a length ratio of $b_{n+1}:b_n \approx 2$, and a second group of $n_0$ non-binary and less significant weighted electrodes representing a fine modulator. At least one electrode of the fine modulator is positioned on one side of the longest electrode (E11) of the coarse modulator.

The lengths and, thus, weightings of the electrodes arranged on different sides of the fine modulator are greater than the resolution (basic step size) of the coarse modulator. The smallest phase modulation steps are generated by simultaneous driving of positive and negative electrodes of the fine modulator or of the fine modulator and of the coarse modulator.

In a second aspect, the invention provides a digital phase modulator for a fiber-optic signal transmission or measuring device. The phase modulator has a total number m of positive and negative electrodes of different lengths that are arranged in parallel and on both sides with respect to a light guiding path in or on an optical substrate. It is possible to apply preferably identical control potentials to the electrodes on both sides of the light guiding path that are affected by opposite electric field strengths in such a way that a multiplicity of phase values can be set through varying selection of driving of electrode combinations within a predetermined value range.

In a digital phase modulator in accordance with the invention, a first group of electrodes with n binary and more significant weighted electrodes with a length ratio of $b_{n+1}:b_n=2$ forms a coarse modulator where n<m; m=total number of all the electrodes, but the length of the longest electrode corresponds to the sum of lengths of all the remaining electrodes of the overall modulator with a weighting value of $$b_m = \sum_{i=0}^{m-1} b_i.$$

A second group of $n_0$ non-binary and less significant weighted electrodes forms a fine modulator, where $n+n_0=m$; $n_0<n$.

The relative length and arrangement of the second group of $n_0$ electrodes along the light guiding path is such that phase value cancellation does not occur for any possible electrode combination. On the other hand, the ratio of the smallest to the largest electrode length for a resolution given by the total number m of electrodes of approximately $1:2^{-m}$ is as large as possible.

The preceding and other features of the invention will become further apparent from the detailed description that follows. Such description is accompanied by a set of drawing figures. Numerals of the drawing figures, corresponding to those of the written description point to the features of the invention. Like numerals refer to like features throughout both the written description and the drawing figures.

DETAILED DESCRIPTION OF THE PREFERRED EMBODIMENT

Figure 1:
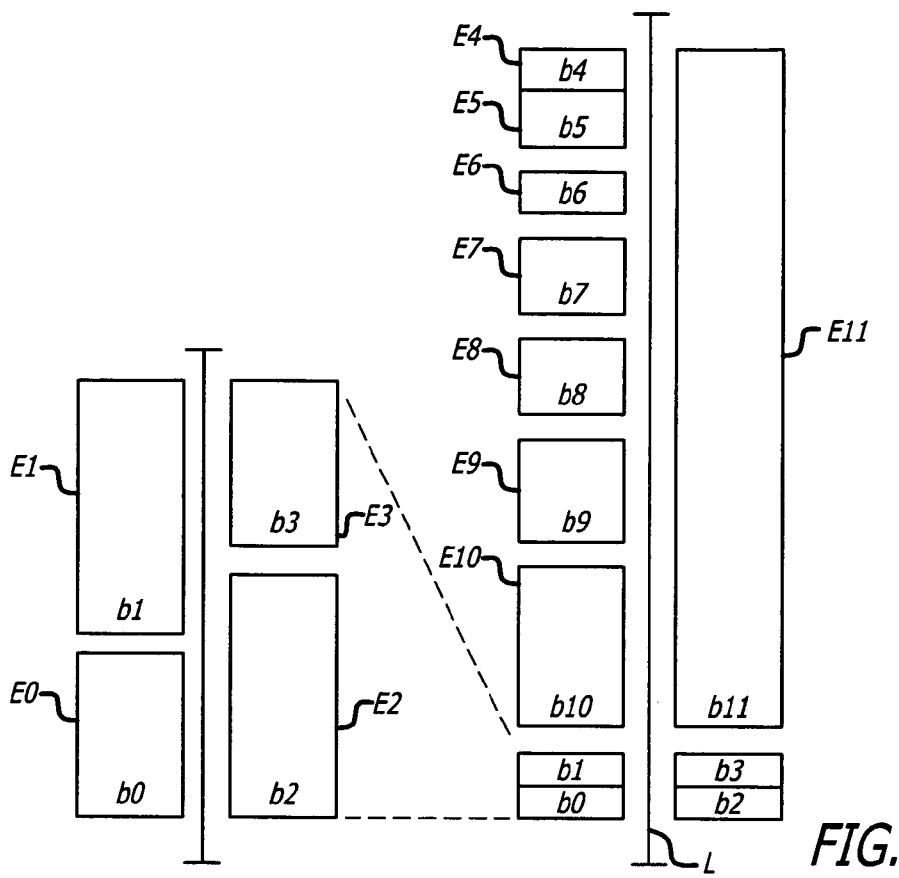
FIG. 1 is a schematic diagram of a first embodiment of the division and arrangement of electrodes of a hybrid phase modulator in accordance with the invention.

FIG. 1 is a schematic diagram of a first embodiment that illustrates a digital phase modulator with increased resolution in accordance with the invention. It comprises a total of twelve electrodes of differing lengths and weightings (designated by E0, E1, . . . E10, E11).

The less significant electrodes E0 to E3 are depicted, greatly enlarged, toward the left in FIG. 1 to illustrate an essential feature of the invention, i.e., their non-binary design. As shown, the electrodes E0, E1 and E4 to E10 arranged to the left of an optical wave guide L occupy value positions $B_0$, $b_1$, and, $b_4$ to $b_{10}$, respectively, while the electrodes E2, E3 and E11, arranged to the right of the wave guide L, occupy value positions $b_2$, $b_3$ and $b_{11}$.

FIG. 1 thus illustrates a so-called "8+4 configuration", in which the upper eight electrodes E4 to E11 are binary weighted to form a first group (designated "coarse modulator"), while the increased resolution is obtained, in accordance with the invention, with suitable interconnection with the lower electrodes E0 to E3 (in particular, by field difference formation). The lower, second group of electrodes E0 to E3 forms a "fine modulator". Should a LOOK-UP RAM correction table fail, the modulator can still continue to be operated with reduced 8-bit resolution. The following preconditions and considerations apply to the dimensioning of the electrodes in accordance with the first embodiment of the invention of FIG. 1:

(1) The ratio $b_{n+1}:b_n$ of electrode size or lengths for the first binary weighted electrode group E4 to E11 should be approximately equal to "2" for n∈ [4:10].

(2) Resolution should be as uniformly fine as possible. That is, the output-side step size should be approximately |1| (=basic step size).

(3) The smallest electrodes should be as large as possible for a given resolution. That is, for a phase modulator as in FIG. 1, the ratio between smallest and largest electrode should not be less than approximately $1:2^{-9}$ as in the case of a conventional 9-bit phase modulator.

(4) All four electrodes of the second electrode group of the fine modulator should be of different sizes as extinctions may otherwise occur.

It follows from point (3) that, according to the invention, the smallest possible resolution is not determined by the length of the smallest electrode. Rather it is the difference between the electrodes that overlap in their region of effect that determines this. If, firstly, the electrode E0 at the value position $b_0$ is fixed as the smallest electrode and the following relationships are introduced:

$$u = b_2 - b_0$$

$$c = b_0$$

$$1 = b_3 + b_2 \approx b_1 + b_0 \quad (1)$$

where "1" designates the total length of the fine modulator, then it follows from the requirement according to point 1 that:

$$u = 1 \quad (2)$$

Since the value c relates to the smallest electrode at zero position ($b_0$), $b_1$ relates to the largest electrode of the fine modulator (see FIG. 1), the following holds true:

$$1 < c < b_3, b_2 < b_1 \quad (3)$$

If 1 ≈is fixed, this leads to the following formulation to satisfy the preconditions (1) and (3):

$$c = b_0 = 7$$

$$b_2 = c + u = 8 \quad (5)$$

In order to satisfy precondition (4), let $$b_3 = b_2 + 1 = 9 \quad (6)$$

This leads to $$1 = b_1 + b_0 = 17 \quad (7)$$

and, due to equation (1), to:

$$b_1 = 1 - c = 10 \quad (8)$$

With these weightings it is possible to represent the values or numbers $$1, 2, \ldots, 7, 8, 9.10, \ldots, 17 \quad (9)$$

with both signs and also the zero.

To close the gap (indicated by ". . . . " in equation (9)) between "2" and "7", the following must hold for the smallest electrode E4 (position $b_4$) of the coarse modulator:

$$b_4 + 10 = 13 \quad (10)$$

The values up to "15" can be thus represented. For the value "16" the following must be satisfied:

$$b_5 - x = 16, x \in [7,8,9,10] \quad (11)$$

If x=10 is chosen, then $b_5 = 2 \cdot b_4$. Since the values of the remaining electrodes of the coarse modulator likewise form powers of two, the desired "classic" 8-bit construction results for the coarse modulator.

The resultant electrode division and weighting of the electrodes E0 to E11 at the positions $b_0$ to $b_{11}$ emerges from Table 1 below as an example of a constructed electrode length sequence with an output dynamic range of $>1:2^{11.5}$.

TABLE 1

| Position | Value |
|---|---|
| $b_0$ | 7 |
| $b_1$ | −8 |
| $b_2$ | −9 |
| $b_3$ | 10 |
| $b_4$ | 13 |
| $b_5$ | 26 |

TABLE 1-continued

| Position | Value |
|---|---|
| $b_6$ | 52 |
| $b_7$ | 104 |
| $b_8$ | 208 |
| $b_9$ | 416 |
| $b_{10}$ | 832 |
| $b_{11}$ | −1652 |

The length or weighting of the electrode E11 with b11=−1652 corresponds exactly to the sum of the weightings of the electrodes E4 to E10 on the opposite side of the waveguide L with positions $b_4$ to $b_{10}$+|1|.

Figure 2:
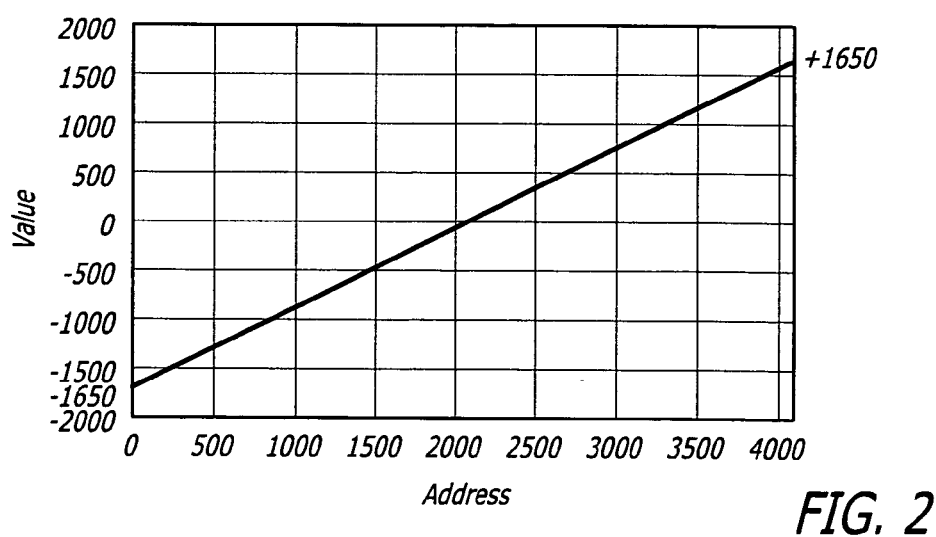
FIG. 2 is a graph of the output characteristic curve of a phase modulator in accordance with FIG. 1.

The example of the output characteristic curve for a digital phase modulator according to FIG. 1 (represented in FIG. 2) illustrates a value range of from −1650 to +1650 with addresses correspondingly assigned from a drive logic. The phase response is demonstrably completely linear.

Figure 3:
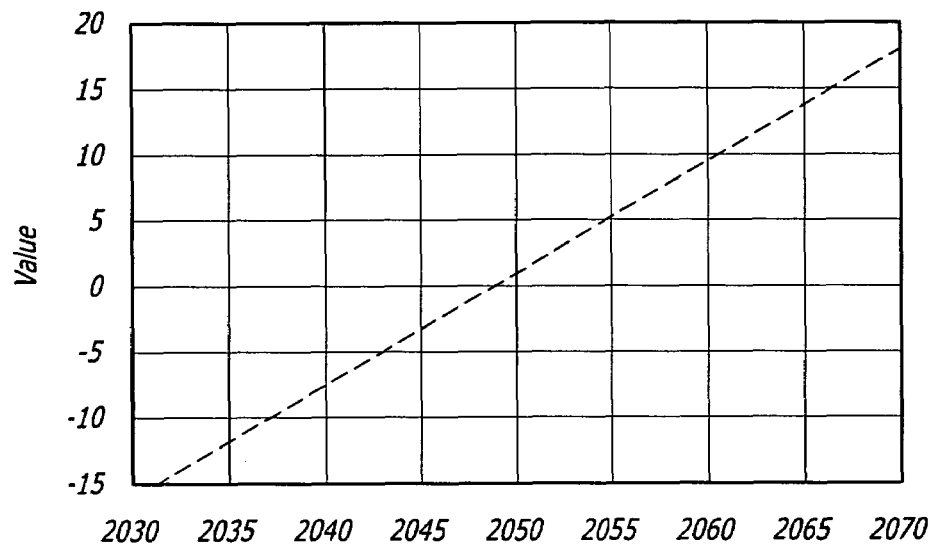
FIG. 3 is a graph of step size about the zero point for a phase modulator in accordance with FIG. 1.

FIG. 3 is a graph of step size about the zero point in accordance with the prior figure. Such enlarged portion of the characteristic curve (from FIG. 2) about the zero point clearly reveals that the step size of a value of |1| is significantly smaller than the length or weighting of the shortest electrode of $b_0$=7.

Figure 4:
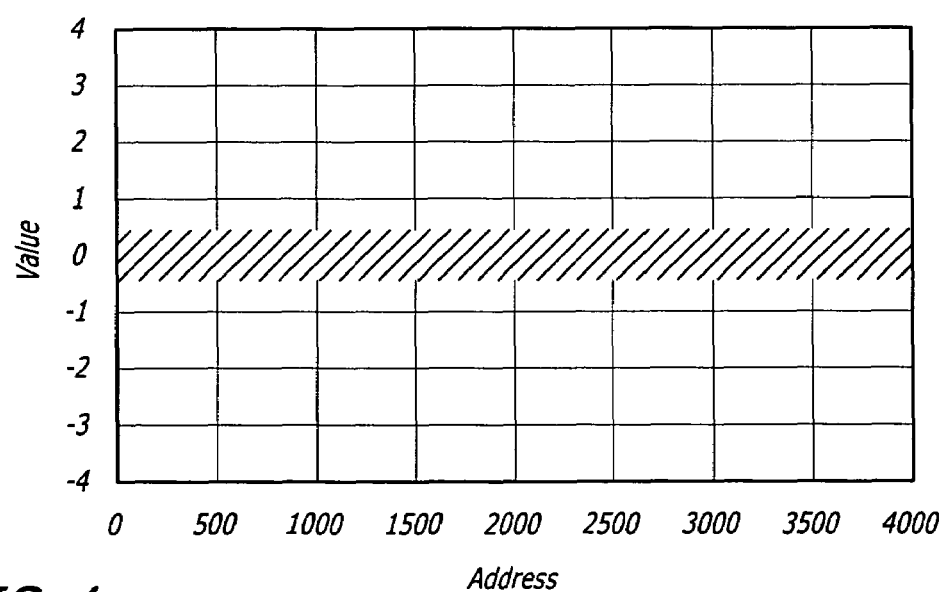
FIG. 4 is a graph of maximum deviations from the ideal output characteristic curve for a digital phase modulator in accordance with FIG. 1.

The plot of FIG. 4 illustrates, for the electrode configuration of FIG. 1, the range of the deviations from the linear behavior, i.e. the residual deviations from an ideal characteristic curve. The derivation for a hybrid electrode structure in accordance with the invention relates to a first tested example of a possible design of the electrode lengths. What is crucial are the preconditions and conditions represented above in respect of the overall modulator and the requirement that no gaps occur in the combination of numbers within the address space (e.g. 11.7 bits).

More generally, in theory, arbitrary electrode configurations can be assembled according to the method depending on the respective boundary conditions that have to be satisfied. The crucial boundary conditions in this case are:

the maximum sought and possible number of output values separated by the basic step size;

the possible length ratio of the longest to the shortest electrode (determined in practice by the maximum possible structural lengths);

the number of possible electrodes. This in turn, limits the combination possibilities and, thus, the maximum dynamic range to $2^n$;

accuracy of the available production process (i.e., the fine tuning of the differences in length of the electrodes);

the emergency operating behavior of the phase modulator without the use or in the event of failure of the correction table(s).

Depending on which of the requirements or boundary conditions is most important, it may be expedient, for example, to allow the electrodes of the fine modulator to overlap those of the coarse modulator. An example of this is given with reference to FIG. 5.

Electrode configurations can be provided in which the fine modulator manages with a sole negative electrode on the same side of the optical waveguide as the longest electrode, and, in return, has three positive electrodes.

It will be apparent to those skilled in the art that resolution can be further increased by the addition of electrodes to the fine modulator—provided that a suitable production process is available.

Figure 5:
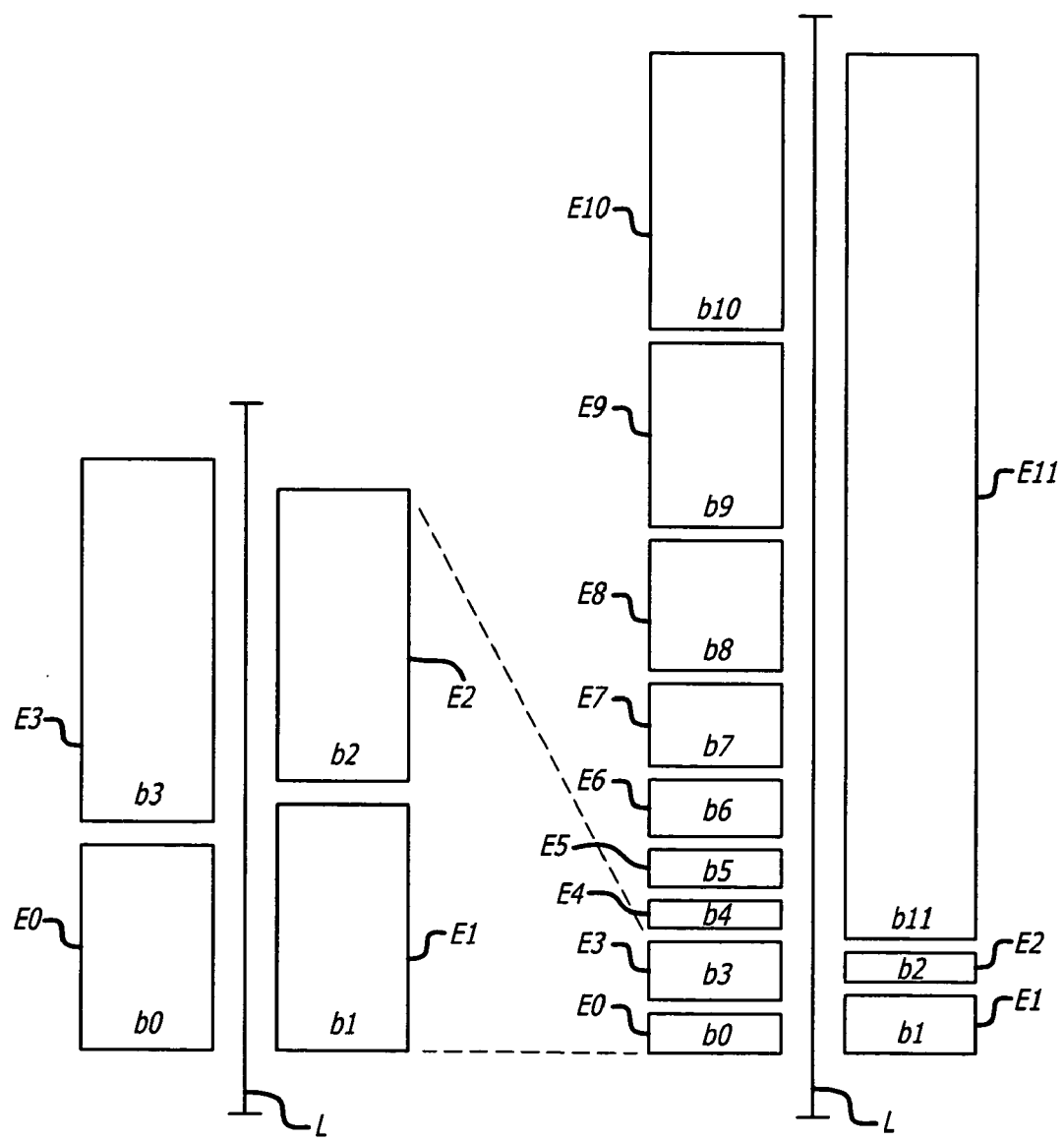
FIG. 5 is a schematic diagram of a second, presently-preferred embodiment of the division and arrangement of the electrodes of a 12-bit hybrid phase modulator in accordance with the invention.

The preferred electrode combination at the present time for a 12-bit modulator with a basic step size |1| is illustrated in FIG. 5. Reference indications with regard to the electrodes E0 to E11 and the corresponding electrode values are again specified by $b_0$ to $b_{11}$ as in FIG. 1. Table 2 illustrates the best possible combination of values or lengths at the current time.

TABLE 2

| Position | Value |
|---|---|
| $b_0$ | 7.00 |
| $b_1$ | −8.00 |
| $b_2$ | −10.00 |
| $b_3$ | 12.00 |
| $b_4$ | 16.00 |
| $b_5$ | 32.00 |
| $b_6$ | 64.00 |
| $b_7$ | 128.00 |
| $b_8$ | 256.00 |
| $b_9$ | 512.00 |
| $b_{10}$ | 1024.00 |
| $b_{11}$ | −2033.00 |

The linear output value range with step size 1:±2029 is achieved with the ratio of longest to shortest electrode of 290:1. The output dynamic range is thus ±2029:1=11.986 bits. FIG. 5 thus illustrates a more general electrode structure in which the fine modulator, drawn in enlarged fashion on the left, is not symmetrical.

Figure 6:
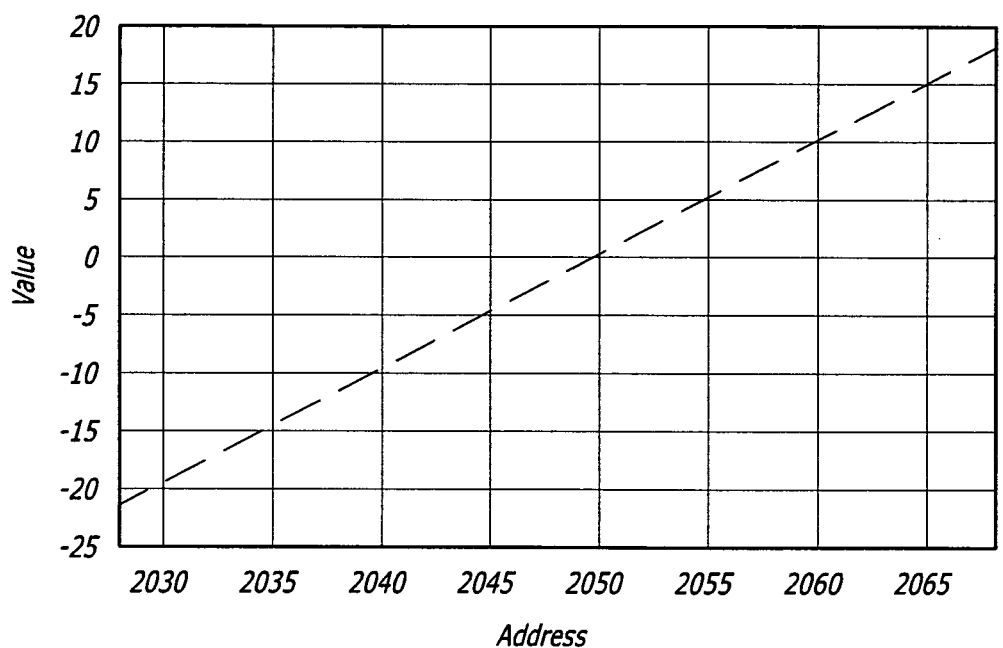
FIG. 6 is a graph of the output characteristic curve for a hybrid phase modulator in accordance with FIG. 5 with value assignment in accordance with an optimized value table (Table 2)

FIG. 6 illustrates a portion of the output characteristic curve of optimized electrode values in accordance with Table 2. In contrast to the portion illustrated in FIG. 3, a plateau-free characteristic curve is obtained when the address range of the converter is restricted to the number of available output states. If, by contrast, the entire address range—in this case 12 bits—is to be exhausted for driving, then plateaus arise at some locations on the output characteristic curve—in a manner similar to that illustrated in FIG. 3—since (e.g. with the electrode configuration of Table 2) only 2029 rather than 2048 output states per sign are continuously available. The number of possible plateaus can be estimated from the difference (4096−"number of output states"). Which one of the two possibilities will be employed depends on the respective requirements.

Examples of configurations of the fine modulator, if appropriate in interaction with the coarse modulator, are given below.

EXAMPLE 1

A minimal configuration of the fine modulator, in which only one electrode is situated on the side of the longest electrode (MSB) of the coarse modulator, is illustrated in Table 3 below.

TABLE 3

| Position | Value | Fine modulator |
|---|---|---|
| $b_0$ | −3.00 | F |
| $b_1$ | 2.00 | |
| $b_2$ | 4.00 | |
| $b_3$ | 8.00 | |
| $b_4$ | 16.00 | |
| $b_5$ | 32.00 | |
| $b_6$ | 64.00 | |
| $b_7$ | 128.00 | |
| $b_8$ | 256.00 | |
| $b_9$ | 512.00 | |

TABLE 3-continued

| Position | Value | Fine modulator |
|---|---|---|
| $b_{10}$ | 1024.00 | |
| $b_{11}$ | −2043.00 | |

A range of 4088 values with a basic step size can be covered. The ratio "resolution to structural length" is approximately 1:2046. The indication "F" in the table specifies the electrode of the fine modulator that is situated on the side of the longest electrode of the coarse modulator.

EXAMPLE 2

Table 4 illustrates an asymmetrical configuration of the fine modulator. In this case, one electrode is situated on the "negative" side and three electrodes of the fine modulator are situated on the "positive" side.

TABLE 4

| Position | Value | Fine modulator |
|---|---|---|
| $b_0$ | 7.00 | F |
| $b_1$ | 11.00 | F |
| $b_2$ | 13.00 | F |
| $b_3$ | 15.00 | |
| $b_4$ | −16.00 | F |
| $b_5$ | 30.00 | |
| $b_6$ | 60.00 | |
| $b_7$ | 120.00 | |
| $b_8$ | 240.00 | |
| $b_9$ | 480.00 | |
| $b_{10}$ | 960.00 | |
| $b_{11}$ | −1920.00 | |

A value range of 3806 can be covered in each case with a basic step size. The ratio "resolution to structural length" is approximately 1:276.

EXAMPLE 3

Table 5 below gives an electrode configuration of a more greatly reduced length ratio and an odd number $n_0$ of electrodes of the fine modulator.

TABLE 5

| Position | Value | Fine modulator |
|---|---|---|
| $b_0$ | 14.00 | F |
| $b_1$ | −13.00 | F |
| $b_2$ | −15.00 | F |
| $b_3$ | −19.00 | F |
| $b_4$ | 22.00 | F |
| $b_5$ | 30.00 | |
| $b_6$ | 60.00 | |
| $b_7$ | 120.00 | |
| $b_8$ | 240.00 | |
| $b_9$ | 480.00 | |
| $b_{10}$ | 960.00 | |
| $b_{11}$ | −1879.00 | |

The range that can be covered with this electrode configuration is 3744 values, each with a basic step size. The ratio "resolution to structural length" is approximately 1:137. The indication "F" once again specifies the electrodes associated with the fine modulator.

The configuration of Table 5 is of particular interest as it represents the basis for an extension of the phase modulator (e.g. to 13 bits) that then enables a resolution of >12.8 bits (>7450 values) given a length ratio of 272:1. This corresponds to that of the configuration in Table 2.

Figure 7:
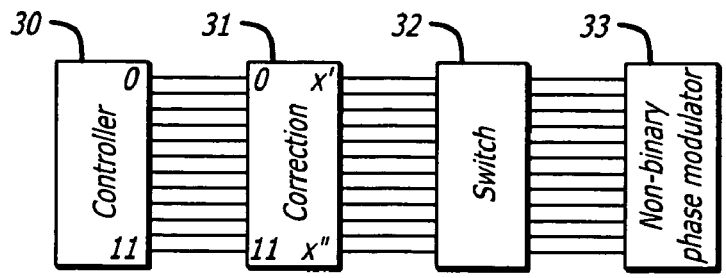
FIG. 7 is a block diagram of a basic arrangement for the electronic correction or conversion of binary values to non-binary values applied to the individual electrodes of a phase modulator in accordance with the invention.

Since binary signal processing is provided within the drive electronics for a phase modulator according to the invention (generally the case), it is possible to use a non-binary phase modulator according to the invention with the aid of a correction table that converts the calculated digital values into non-binary values. The correction table may be designed to be programmable in stored-program fashion and, in addition to the conversion of binary values into non-binary values, it may also correct production-dictated or operational errors in the phase modulator. FIG. 7 illustrates the basic circuit construction. From a control device (controller) 30, the binary values corresponding to a specific phase value are fed to a conversion or correction table 31 that controls a downstream switch 32. The individual electrodes E0 to E11 of the phase modulator 33 are driven by means of the switch 32 with a signal combination corresponding to the non-binary value.

Figure 8:
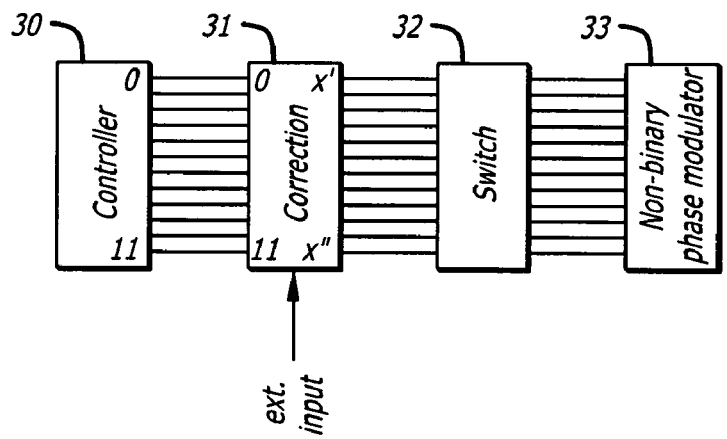
FIG. 8 is a block diagram, corresponding to FIG. 7, of a correction table including an external correction.
Figure 9:
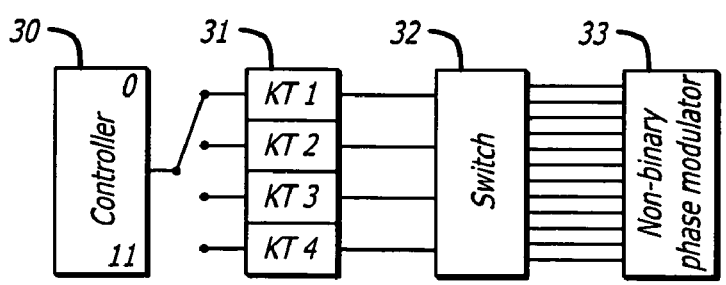
FIG. 9 is a modified block diagram of a circuit in accordance with FIG. 7 that includes the option of changing between a plurality of correction tables stored in a memory.

The embodiment of the conversion or correction circuit according to FIG. 8 makes it possible to feed an external signal at the correction table (e.g. a temperature signal or a signal that takes account of aging-dictated changes) as subsequent correction. In the case of the conversion and correction circuit of FIG. 9, a plurality of correction tables (e.g. four correction tables KT1 to KT4) are provided. The correction tables may be integrated in an ASIC and making it possible to connect in an optimized correction table in each case in a manner dependent on an external signal.

As a result of the invention, it is possible to produce a digital phase modulator with significantly increased resolution without requiring a length ratio corresponding, for example, to $1:2^{12}$. Considerable technological advantages emerge from this.

The ideas common to all the possible electrode configurations according to the invention are
1. Division into a binary and a non-binary modulator part, and
2. Generation of the fine gradation by forming the difference between electrode values, whereby the shortest electrode of the modulator does not limit resolution.

Preferably, but not mandatorily, the number $n_0$ of electrodes of the fine modulator is even-numbered, where $n_0 < n$.

It is not absolutely necessary that the electrodes of the modulator be situated exactly spatially opposite. This arrangement will be the rule not only for reasons of better visuality. The fine modulator may also have an asymmetrical number of electrodes. The number of electrodes of the fine modulator is then distributed unequally between the two sides of the light guiding path. It is important, however, that at least one electrode of the fine modulator be positioned on the side of the longest electrode of the coarse modulator as in the exemplary embodiments of FIGS. 1 and 5.

A phase modulator according to the invention is generally realized as a structural unit within or on a multifunctional integrated optical chip (MIOC) on or in whose substrate (made, e.g., of lithium niobate ($LiNbO_3$)) polarization-maintaining light guiding paths can be formed. In the case of an FOG, such an MIOC also contains a polarizer, for example, in addition to a beam splitter. The phase modulator (i.e. its positive and negative electrodes) having different lengths, influences the phase of the two light paths running in opposite directions after a branching. An MIOC with an integrated digital phase modulator is known, therefore details not important to the invention require no discussion.

It is certainly possible to achieve the accuracy and resolution of a digital phase modulator by increasing the total length of the MIOC with pure binary weighting of the electrodes. In such case, a minimum length of approximately 40 μm would be required for the LSB electrode as shorter lengths lead to large inaccuracies due to field distortions and production tolerances. A total electrode length of approximately 10 mm would then result for a 9-bit converter. If it were desired to provide a 12-bit converter with the same specification for a specific modulation voltage range (e.g. the $U_\pi$ range in the case of an FOG) and the above-mentioned LSB minimum length of the smallest electrode, the longest electrode would have a length of approximately 80 mm, unrealistic for a number of reasons.

The invention takes a different approach. It employs a combined modulator configuration in which binary and non-binary electrode groups are combined that does not require a correction table nor lengthening the overall construction.

The following requirements can be satisfied with a modulator in accordance with the invention:

(1) The following holds true for the length ratio or the weightings of the electrodes of the first group: $b_{n+1}:b_n \approx 2$ for $n > n_0$.

(2) Output-side step size is equal to |1| (=basic step size) apart from boundaries of the output value range (explained in greater detail below).

(3) The smallest electrodes employed have a ratio of $<1:2^{-9}$ given a resolution of approximately $1:2^{-11.5}$ with respect to the total length of the phase modulator.

(4) All of the electrodes are of different lengths, so that no field extensions occur.

The invention employs the idea that value differences between positive and negative electrodes overlapping in their regions of effect may be used to obtain finer resolution than is given by the shortest electrode.

The use of a hybrid length division of the electrodes into a plurality of groups (i.e. binary and non-binary), affords the following advantages:

It is possible to achieve a resolution of >3300:1 given a length ratio ("modulator length to shortest electrode") of <235:1.

Residual error is minimized (see FIG. 4) with uniform distribution over a predetermined total address space.

A modulator according to the invention can be operated with a correction table in a known manner. What is important, however, is that operation is also possible without a correction table with only slightly reduced accuracy. This reduces problems in safety-critical applications.

The total resolution of the phase modulator is significantly better than the ratio of total length to the length of the shortest electrode. The effective resolution that can currently be achieved with 12 electrodes is >11.68 bits ($\approx \log_2(3300)$).

While this invention has been described with reference to its presently-preferred embodiment, it is not limited thereto. Rather, the invention is limited only insofar as it is defined by the following set of patent claims and includes within its scope all equivalents thereof.

The invention claimed is:

1. A method for increasing the resolution of a digital phase modulator for a fiber-optic signal transmission or measuring device, having a total number m of positive and negative electrodes of different lengths which are arranged parallel and on both sides of a light guiding path in or on an optical substrate to which identical control potentials can be applied, which, depending on the position of the electrodes with respect to the light guiding path, effect a positive or negative shift in the light phase output of the modulator, a multiplicity of phase values being set in accordance with combinations of positively and negatively acting electrodes within a predetermined value range, characterized in that the total number m of electrodes is divided into groups,
from a first group n of electrodes forming a coarse modulator with binary and, in terms of their contribution to the light phase shift, more significant weighted electrodes with a length ratio of $b_{n+1}:bn \approx 2$ being formed, and from a second group of $n_0$ non-binary and, in terms of their contribution to the light phase shift, less significant weighted electrodes a fine modulator being formed, at least one electrode of said fine modulator being positioned on the side of the longest electrode of the coarse modulator, and the lengths on the light phase shift of the electrodes arranged on different sides of the fine modulator being selected to be greater than the resolution of the overall modulator and the smallest phase modulation steps being generated by simultaneous driving of positive and negative electrodes of the fine modulator or of the fine modulator and of the coarse modulator.

2. The method as claimed in claim 1, characterized in that the number of electrodes of the coarse modulator is n=8, the longest of said first group of electrodes being arranged on one side and all further ones being arranged on the other side of the light guiding path.

3. The method as claimed in claim 2, characterized in that the number of electrodes of the fine modulator is $n_0=4$, the shortest and the longest of said second group of electrodes being arranged on one side of the coarse modulator and two middle length ones of said second group of electrodes being arranged on the other side of the coarse modulator.

4. The method as claimed in claim 3, characterized in that the second group of electrodes of the fine modulator is assigned the following values of the value range:
shortest electrode value=7,
highest electrode value=10,
smaller of middle length electrode values=−8,
larger of middle length electrode values=−9 and the first group of electrodes of the coarse modulator, through corresponding length and positioning, is assigned the following values of the value range:
binary base value of the shortest electrode $b_n$=13,
values of the following six electrodes $b_{n+1}:b_n$=2, and
value of the longest electrode =−1652.

5. The method as claimed in claim 2, characterized in that the number of electrodes of the fine modulator is $n_0$ =4, the shortest and the longest of said second group of electrodes being arranged on the side of the further electrodes of the coarse modulator and two middle length ones of said second group of electrodes being arranged on the side of the longest electrode of the coarse modulator.

6. The method as claimed in claim 5, characterized in that the second group of electrodes of the fine modulator is assigned the following values of the value range:
shortest electrode value=7,
highest electrode value=12,
smaller of middle electrode values=−8, larger of middle electrode values=−10 and the first group of electrodes of the coarse modulator is assigned the following values of the value range:
binary base value of the shortest electrode $b_n$=16,
values of the following six electrodes $b_{n+1}:b_n$+2, and
value of the longest electrode=−2033.

7. The method as claimed in claim 1, characterized in that the value assigned to the output value range of the light phase shift as smallest step size of the value range is generated by simultaneous driving of electrodes situated opposite one another via the light guiding path from the second number $n_0$ of electrodes of the fine modulator.

8. A digital phase modulator for a fiber-optic signal transmission or measuring device, which has a total number m of positive and negative electrodes having different lengths which are arranged parallel and on both sides with respect to a light guiding path in or on an optical substrate, it being possible to apply identical control potentials of opposite field strengths to the electrodes on both sides of the light guiding path in such a way that a multiplicity of phase values can be set through varying combinations of positive and negative electrodes within a predetermined value range, characterized by a first group of electrodes, which forms a coarse modulator with n binary and more significant weighted electrodes with a length ratio of $b_{n+1}:b_n$ of approximately 2, where n<m; m=total number of the electrodes, and the length of the longest electrode corresponds to the sum of lengths of all the remaining electrodes of the overall modulator with a weighting value of $$b_{m-1} = \sum_{i=0}^{m-2} b_i,$$

a second group of $n_0$ non-binary and, in terms of their contribution to the light phase shift, less significant weighted electrodes, which forms a fine modulator, where $n+n_{0=m};\ n0<n$;

a relative length and arrangement of the second group of $n_0$ electrodes along the light guiding path in such a way that phase value cancellation results for no possible electrode combination, and the ratio of the smallest to the largest electrode length for a resolution given by the total number m of electrodes of approximately $1:2^{-m}$ is a maximum.

9. The phase modulator as claimed in claim 8, characterized in that the longest of the first group of n electrodes of the coarse modulator, is arranged on one side and all the rest of the first group are arranged on the other side along the light guiding path.

10. The phase modulator as claimed in claim 9, characterized in that the smallest step size of the output value range of the phase is determined by the smallest length difference between positive electrodes on one side and negative electrodes on the other side of the light guiding path.

11. The phase modulator as claimed in claim 8, characterized in that the lengths of the electrodes are chosen such that the sum of or difference between electrode lengths results in a predetermined output value range—following a linear characteristic curve—of the phase of a signal on the light guiding path whose resolution is greater than the ratio of the smallest electrode length to the total length of the phase modulator on the carrier material.

12. The phase modulator as claimed in claim 8, characterized in that at least two electrodes of the fine modulator that are arranged on opposite sides along the light guiding path partially overlap in their region of effect on a light wave running on the light guiding path, while at least two other electrodes of the fine modulator arranged adjacent thereto are offset with respect to one another with regard to their region of effect on the light wave, the smallest resol333ution being determined by the difference in length of the overlapping electrodes.

13. The phase modulator as claimed in claim 8, characterized in that the ratio of the smallest to the largest electrode length is approximately $1:2^{-9}$.

14. The phase modulator as claimed in claim 13, characterized in that the number of electrodes of the coarse modulator is n=8 and the number of electrodes of the fine modulator is $n_0$=4, and the selection of the lengths of the electrodes at positions $b_0$ to $b_{11}$ is made such that a resolution >11 bits results.

15. The phase modulator as claimed in claim 14, characterized in that the relative lengths of the electrodes of the coarse modulator are chosen such that the weighting of binary weighted electrodes of the coarse modulator on the light phase shift begins with the value $b_4$=13 and ends with the value $b_{10}$=832, and in that the longest electrode is assigned the value $b_{11}$=−1652, and in that the maximum resolution is 11.7 bits.

16. The phase modulator as claimed in claim 14, characterized in that the relative lengths of the four electrodes of the fine modulator are chosen such that, at positions $b_0$ to $b_3$ assigned to them, the values $b_{1=\_}8$ and $b_{2=\_}10$ are defined on the side of the longest electrode of the coarse modulator with the position $b_{11}$ and the values $b_0$=7 and $b_{3=}12$ are defined on the opposite side of the light guiding path.

17. The phase modulator as claimed in claim 16, characterized in that the relative lengths of the electrodes of the coarse modulator are chosen such that the weighting of binary weighted electrodes of the coarse modulator on the light phase shift begins with the value $b_{4=}16$ and ends with the value $b_{10}$=1024, and in that the longest electrode is assigned the value $b_{11=\_}2033$, and the maximum resolution is 11.986 bits.

18. The phase modulator as claimed in claim 13, characterized in that the relative lengths of four electrodes of the fine modulator are chosen such that, at positions $b_0$ to $b_3$, the values $b_1$=−8 and $b_2$=−9 are defined on the side of the longest electrode of the coarse modulator with the position $b_{11}$ and the values $b_0$=7 and $b_3$=10 on the opposite side of the light guiding path.

* * * * *